March 8, 1927.
P. L. STARR
1,619,832
LATHE ATTACHMENT
Filed July 29, 1922
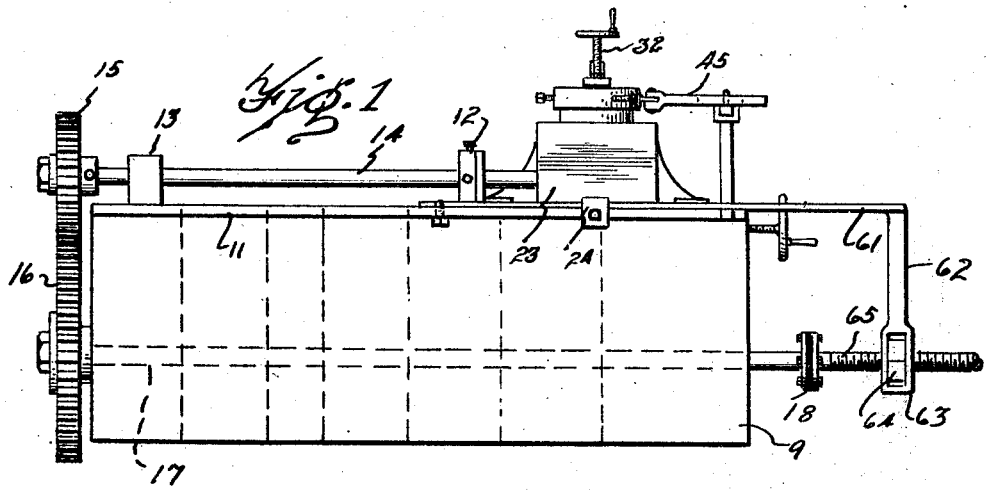
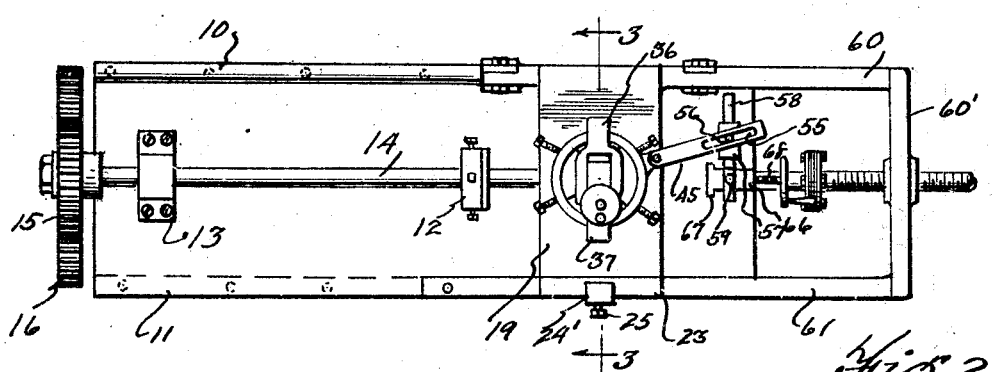
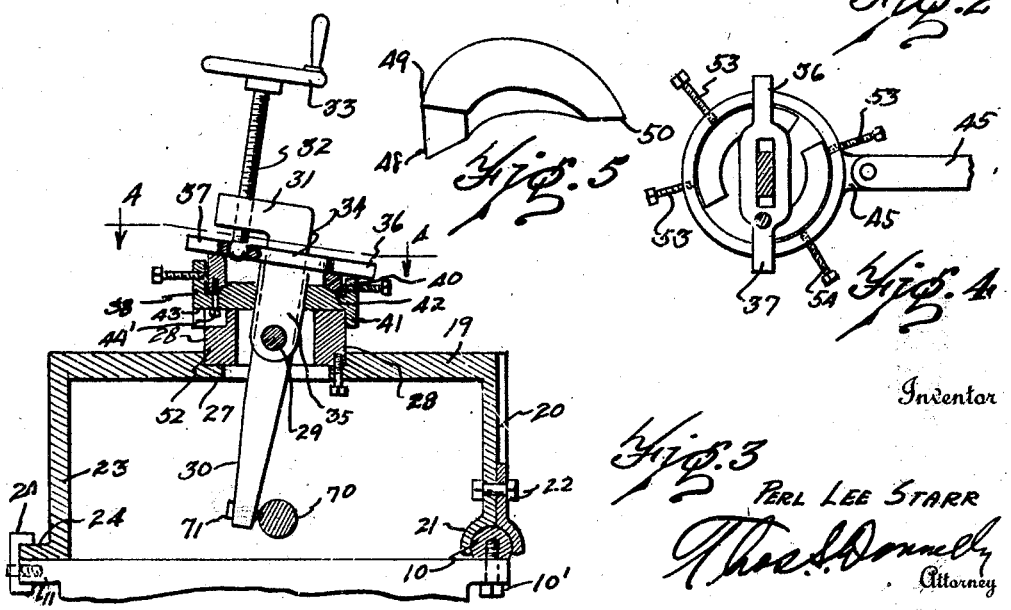
Inventor
Perl Lee Starr
Attorney Patented Mar. 8, 1927.

1,619,832

UNITED STATES PATENT OFFICE.

PERL LEE STARR, OF DETROIT, MICHIGAN.

LATHE ATTACHMENT.

Application filed July 29, 1922. Serial No. 578,481.

My invention relates to a new and useful improvement in a lathe attachment and has for its object the provision of means for rapidly and efficiently moving the cutting tool relatively to the work piece.

Another object of the invention is the provision in a cutting tool holder of means for quickly and easily changing the angle of the tool holder relatively to the work piece and of locking said holder in various positions.

Another object of the invention is the provision in a lathe attachment of means for advancing and withdrawing the cutting tool toward or from the work piece as the same is worked upon.

Another object of the invention is the provision in a lathe attachment of means for quickly and easily moving the cutting tool into or out of engagement with the work piece.

Other objects will appear hereinafter.

The invention consists in the combination and arrangement of parts hereinafter described and claimed.

The invention will be best understood by reference to the accompanying drawings which form a part of this specification and in which, Fig. 1 is a side elevational view of the invention, Fig. 2 is a top plan view of the invention, Fig. 3 is a sectional view taken on substantially line 3—3 of Fig. 2, Fig. 4 is a view taken on substantially line 4—4 of Fig. 3, and Fig. 5 is a perspective view of one of the wedges used in the invention.

Although the invention is adapted for use on the ordinary standard lathe I have shown it applied to a discarded cylinder block 9 of a motor car, thus illustrating the simplicity with which a utility lathe may be constructed by one who does not possess a lathe bed and demonstrating how the invention may be thus utilized. The device is shown as mounted upon the base of a cylinder block which is provided at each side with a flange to which is secured by means of suitable screws the drip pan for the automobile. Secured to one of these flanges by means of suitable screws or bolts 10' is a cylindrical rod 10 which has one of its sides flattened so as to provide a firm resting surface to engage the upper side of the flange. The flange 11 at the other side of the cylinder block serves as a guide for the turret support, as will appear herein. Mounted upon the block are suitable bearings 12 and 13 in which is journaled a shaft 14 to one end of which is mounted a gear 15 adapted to mesh with the gear 16 which is fixedly mounted upon the shaft 17 which is projected through the block and journaled in suitable bearings, the shaft 17 being provided at one end with a coupling member 18.

A housing is provided which embodies a supporting platform 19 having a downwardly depending portion 20, the lower end 21 of which is curved so as to embrace the rod 10 at one side thereof. Secured to the end 21 by means of a suitable bolt is an arm 22 having its lower end curved to partially surround the rod 10, the construction being such that upon tightening the bolt which secures the member 22 to the lower end of the member 20, the member 20 will be secured to the rod 10 in such a manner that it cannot be removed therefrom without loosening the bolt projected through the members 20 and 22 and yet permitting the member 20 to slide longitudinally of the rod. The opposite side of the member 19 is provided with a downwardly depending leg-forming portion 23 which has a flange 24 formed at the lower end thereof adapted to engage between a guide clip 24' and the flange 11, a suitable bolt 25 serving to secure the clip in position on the block 9.

Formed in the supporting platform 19 is an opening 26, the opening being provided with a peripheral flange at its under side. A head 28 which is provided with a bore is secured by means of a pin 29 to an arm 30 which is projected through the bore of the head and is maintained therein in free swinging relation transversely to the pin. The upper end of the arm 30 is laterally turned to provide a portion 31 in which is formed a bore which is interiorly threaded for the reception of the threaded member 32 which is provided at its upper end with a suitable hand wheel 33 or other suitable means for rotating the member 32. The lower end of the member 32 is secured to the member 34 in free rotatable relation thereto by means of a ball and socket joint. The member 34 comprises a neck portion which embraces the arm 30 and is provided with downwardly depending lugs 35 which are secured to the pin 29. Radiating outwardly from the neck portion or hub 34 is a pair of arms 36 and 37 which are diametrically opposite each other. These arms project beyond the periphery of a ring 38 which is positioned in embracing relation to the arm 30 upon the head 28 so as rest loosely thereon. The ring 38 is provided with circumferential flanges 40 and 41, which flanges serve as guide members to retain the ring in position on the head. The flange 41 is provided at opposite sides with slots 43 to permit the passage of a bolt therein sufficiently to project into a threaded socket formed in the wedge members to retain the same in proper circumferential position relatively to the ring 38. Projecting outwardly from the ring 38 is an arm 45 which is connected by a swivel connection 46 to another arm 45' the outer end of which, as shown in Fig. 1, is provided with an elongated slot 55 in which rides a stud 56 which projects upwardly from a sleeve 57 slideably positioned on the arm 58 which is mounted upon the block 9 so as to swing thereon and which may be locked fixedly relatively to the block by means of the wing nut 59. As shown in Fig. 3, the ring 38 is provided at the base of the flange 40 with a bevel groove 52 in which engages the under bevel surface 48 of a wedge member which is positioned on the ring 38. Two of these wedges are used. They are positioned on the ring 38 and secured thereon, diametrically opposite each other by means of a bolt projected through the slot 43. As shown in Fig. 5, these wedges are provided with a beveled under surface and taper to a point 50, the end 49 being the thickest end. They are positioned within the flange 40, as shown in Fig. 4, so that their upper surfaces may engage the lower or under surface of the arms 36 and 37. Projected through the flange 40 are set screws 53 and 54 which are adapted to engage the periphery of the wedge members so as to force the same inwardly of the ring 38 and thereby raise them on the beveled edge of the groove 52 so as to cause the wedges to press more tightly against the under surface of the arms 36 and 37.

A side member 60 projects outwardly from the leg 20 and is connected by a cross member 60' to an extension 61 of the flange 23. Depending from the cross member 60' is a leg 62 which is provided at its lower end with a pocket 63 provided at one side with a slot 64 in which a split nut of the conventional type may be placed. At the opposite side of the pocket is another slot from which project the hand grips designed to operate a pair of jaws for maintaining the split nut in closed relation to a threaded member 65 projected therethrough, said member 65 being rigidly attached to the coupling 18.

Mounted on the cylinder block is a bearing 66 in which is mounted a sleeve 67 projected through which is a centering spindle 68, provided with a suitable hand wheel 69 for rotating said spindle and threading it toward and away from the work piece, 70. A cutting tool 71 is mounted in the lower end of the arm 30 and adapted to engage and operate upon the work piece.

A suitable chuck is mounted upon the shaft 14 and serves to retain the work piece placed therein in the proper position for the operation, the chuck being of conventional design. In operation the work piece is placed in the chuck and the centering spindle is moved into engagement with the work piece. The cutting tool is then placed in the proper operative relation to the work piece and power transmitted to the shaft 14 or the shaft 17. This causes a rotation of the work piece and also causes a rotation of the shaft 17. When it is desired to thread a member, the member 65 chosen is provided with the nature of the thread desired on the work piece and the split nut selected to mesh with the threads on the member 65. When the shaft 17 rotates this causes a feeding of the member 65 through the nut thereby bringing about a sliding movement of the turret head and support along the block so as to present the work piece along the cutting tool, as will be readily understood.

It will be noted that as the member 32 is rotated the arm 30 is caused to swing on the pin 29 as a pivot. The wedge members serve as a base for the arms 36 and 37. The arm 45 is moved into the position which locks the member 34 in rigid position. The member 32 is then rotated until the cutting tool makes the desired engagement with the work piece. After the desired distance has been traveled on the work piece the arm 45 is moved so as to release the pressure on the wedges on the arms 36 and 37. This permits the disengagement of the cutting tool from the work piece and permits its removal to the point of beginning on the work piece so that in cutting threads the original adjustment of the member 32 is retained for a recutting of the threads being formed. As the cutting progresses the member 32 permits of adjustment of the cutting tool relative to the work piece to enable a deeper cutting of the threads.

When it is desired to operate upon a work piece in which the position of the cutting tool does not change longitudinally of the work piece the member 65 is dispensed with and the member 32 serves as a means for feeding the cutting tool deeper into the work.

In cutting material in which a taper is desired the arm 45 is attached to the sleeve 57 in the manner already described. As the feeding through the member 65 takes place the sleeve travels along the arm 58 and a gradual turning of the wedges relatively to the head and arms 36 and 37 takes place thus bringing about a greater swing or a less swing, as desired, of the arm 30. The arm 58 may be locked on the block 9 in a position so as to be inclined toward the housing or away from it, depending upon whether the small point of the taper is the starting point or the large part. It is believed to be evident that the connection at the arm 58 is dispensed with unless it is desired to cut a taper. It will be noted that the arm 30 swings in its adjustment as a radius and that the head 28 may be adjusted circumferentially of the supporting platform by means of the screws 72. The wedges are positioned on the ring 38 with their thin ends toward each other so that there is a gradual approach of the thick end of one member as the thin end of the other member approaches the arms 36 and 37. The position of the wedge members 47 and 51 may be altered on the ring by means of the securing bolts 44', as it may not always be desired to have the same diametrically opposite each other.

While I have illustrated and described the preferred forms of construction I do not desire to limit myself to the precise forms of structure shown but wish to avail myself of such variations and modifications as come within the scope of the appended claims.

Having thus described my invention what I claim as new and desire to secure by Letters Patent is:

1. In a device of the class described, a tool holder; means for adjusting the angular position of said holder relatively to the work piece; wedge members for locking said holder in adjusted position; a ring for supporting said wedge members; and means for rotating said ring for releasing said holder for movement relatively to the work piece without disturbing the angular adjustment thereof.

2. In a device of the class described, a tool holder; a supporting member having an angularly turned end provided with threaded opening formed therein; a plate having an opening for accommodating said supporting member; a stem threaded through said threaded opening and secured to said plate; a pair of wedge-shaped members adapted for engaging the under surface of said plate and a ring having a groove formed on its upper surface for engaging said wedge-shaped members.

3. In a device of the class described; a tool holder; means for adjusting the angular position of said holder relatively to the work piece; means for locking said holder in adjusted position; a ring for supporting said locking means; and means for rotating said ring for releasing said holder for movement relatively to the work piece without disturbing the angular adjustment thereof.

4. In a device of the class described, a tool holder; a supporting member having an angularly turned end provided with a threaded opening formed therein; a plate having an opening for accommodating said supporting member; threaded means projecting through said opening and secured at one end swivelly to said plate; adjusting means for engaging the under surface of said plate; and a ring having a groove formed on its upper surface for engaging said adjusting means.

In testimony whereof I have hereunto set my hand at Detroit, in the county of Wayne and State of Michigan.

PERL LEE STARR.